(12) United States Patent
Kim et al.

(10) Patent No.: US 9,807,792 B2
(45) Date of Patent: Oct. 31, 2017

(54) METHOD AND APPARATUS FOR ACCESSING CHANNEL

(71) Applicant: LG ELECTRONICS INC., Seoul (KR)

(72) Inventors: Jeongki Kim, Seoul (KR); Suhwook Kim, Seoul (KR); Yongho Seok, Seoul (KR); Hangyu Cho, Seoul (KR); Kiseon Ryu, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/906,525

(22) PCT Filed: Aug. 4, 2014

(86) PCT No.: PCT/KR2014/007175
§ 371 (c)(1),
(2) Date: Jan. 20, 2016

(87) PCT Pub. No.: WO2015/020377
PCT Pub. Date: Feb. 12, 2015

(65) Prior Publication Data
US 2016/0165637 A1    Jun. 9, 2016

Related U.S. Application Data

(60) Provisional application No. 61/862,077, filed on Aug. 4, 2013.

(51) Int. Cl.
*G08C 17/00* (2006.01)
*H04W 74/00* (2009.01)
(Continued)

(52) U.S. Cl.
CPC ......... *H04W 74/006* (2013.01); *H04W 28/18* (2013.01); *H04W 52/0229* (2013.01);
(Continued)

(58) Field of Classification Search
CPC ..................... H04W 74/006; H04W 76/046
(Continued)

(56) References Cited

U.S. PATENT DOCUMENTS

2006/0291402 A1   12/2006  Yun et al.
2008/0056297 A1    3/2008  Gaur et al.
(Continued)

FOREIGN PATENT DOCUMENTS

WO      2012-077952      6/2012

OTHER PUBLICATIONS

PCT International Application No. PCT/KR2014/007175, International Search Report dated Nov. 12, 2014, 4 pages.

*Primary Examiner* — Iqbal Zaidi
(74) *Attorney, Agent, or Firm* — Lee Hong Degerman Kang Waimey

(57) ABSTRACT

A method and an apparatus for accessing a channel are disclosed. The method of an STA accessing a channel may comprise the steps of: and STA that is operable in a power-saving mode switching from a sleep state to an active state during a beacon interval; the STA monitoring a channel access parameter frame after being switched to the active state; the STA receiving the channel access parameter frame from an AP, wherein the channel access parameter frame includes EDCA set determining information; and the STA accessing a channel using an EDCA parameter determined on the basis of the EDCA set determining information, wherein the channel access parameter frame can be transmitted at least once between beacon intervals.

10 Claims, 22 Drawing Sheets

(51) Int. Cl.
*H04W 28/18* (2009.01)
*H04W 52/02* (2009.01)
*H04W 76/04* (2009.01)
*H04W 84/12* (2009.01)

(52) U.S. Cl.
CPC .......... *H04W 76/046* (2013.01); *H04W 74/00* (2013.01); *H04W 84/12* (2013.01); *Y02B 60/50* (2013.01)

(58) Field of Classification Search
USPC .................................................. 370/311–345
See application file for complete search history.

(56) References Cited

U.S. PATENT DOCUMENTS

| | | | |
|---|---|---|---|
| 2008/0240049 A1 | 10/2008 | Gaur | |
| 2013/0176902 A1* | 7/2013 | Wentink ............ | H04W 52/0219 370/255 |
| 2013/0235773 A1* | 9/2013 | Wang ................ | H04W 52/0206 370/311 |
| 2015/0098459 A1* | 4/2015 | Lee ...................... | H04W 48/16 370/338 |

* cited by examiner

FIG. 1
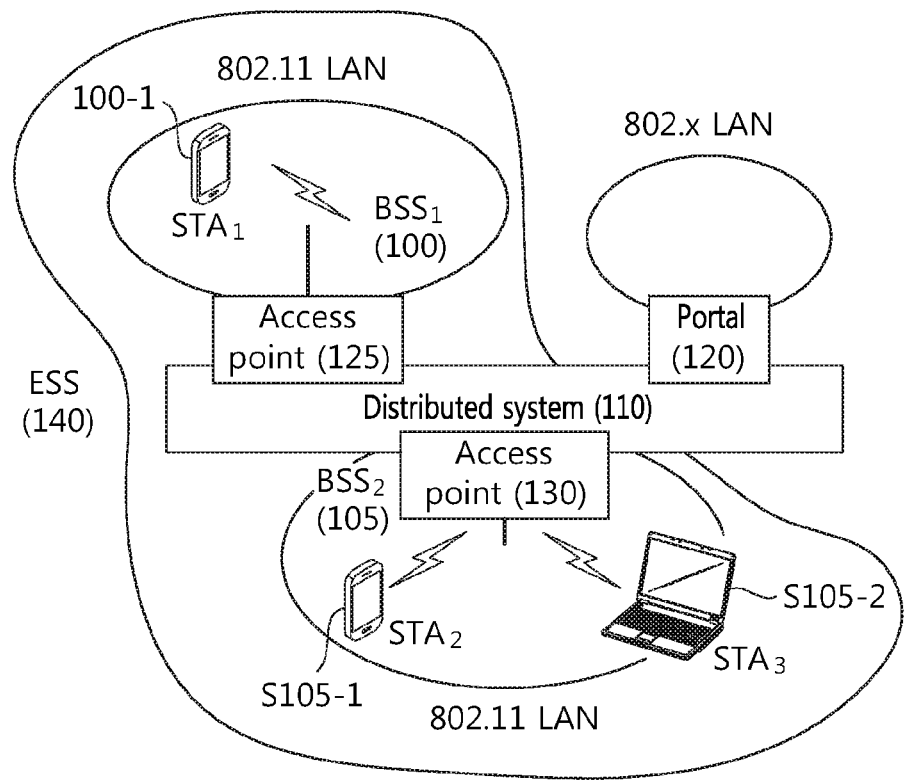
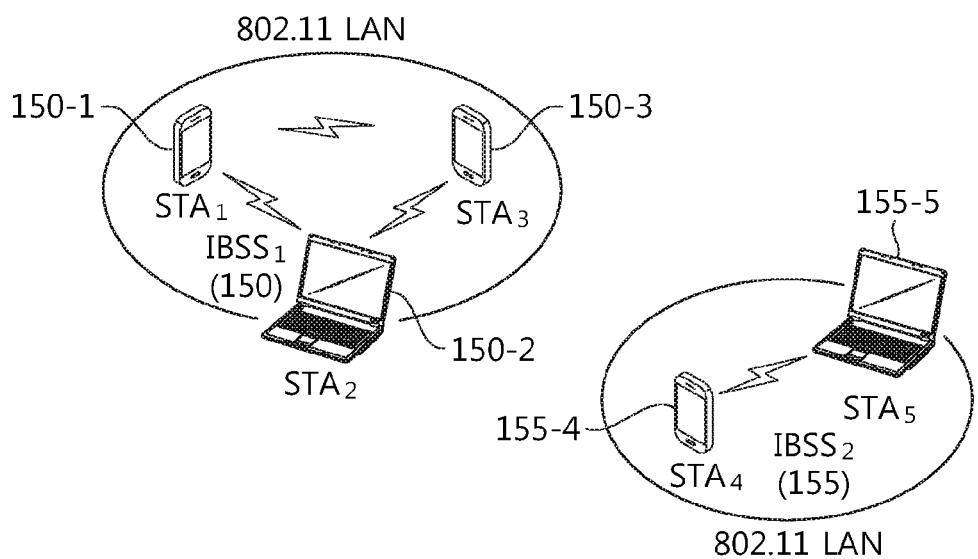

METHOD AND APPARATUS FOR ACCESSING CHANNEL

CROSS-REFERENCE TO RELATED APPLICATIONS

This application is National Stage filing under 35 U.S.C. 371 of International Application No. PCT/KR2014/007175, filed on Aug. 4, 2014, which claims the benefit of U.S. Provisional Application No. 61/862,077, filed on Aug. 4, 2013, the contents of which are all hereby incorporated by reference herein in their entirety.

BACKGROUND OF THE INVENTION

Field of the Invention

The present invention relates to a method and apparatus for a channel access and, more particularly, to a method and apparatus for a channel access in wireless local area network (WLAN).

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

An object of the present invention is to provide a method for a channel access in WLAN.

Another object of the present invention is to provide an apparatus for performing a channel access in WLAN.

In an aspect, a method for performing a channel access by a station (STN) is provided. The method may include switching, by the STA operating in a power saving mode, to an awake state from a doze state during a beacon interval, monitoring, by the STA, a channel access parameter frame, after the STA is switched to the awake state, receiving, by the STA, the channel access parameter frame from an access point (AP), wherein the channel access parameter frame includes enhanced distributed channel access (EDCA) set determination information, and performing the channel access, by the STA, by using a channel access EDCA parameter determined based on the EDCA set determination information, wherein the channel access parameter frame may be transmitted at least once during the beacon interval.

In another aspect, a station (STA) that performs a channel access is provided. The STA may include a radio frequency (RF) unit receiving a wireless signal, and a processor selectively connected to the RF unit, wherein the processor is configured to perform, switching to an awake state from a doze state during a beacon interval when operating in a power saving mode, monitoring, a channel access parameter frame, after the STA is switched to the awake state, receiving the channel access parameter frame from an access point (AP), wherein the channel access parameter frame includes enhanced distributed channel access (EDCA) set determination information, and performing the channel access by using a channel access EDCA parameter determined based on the EDCA set determination information, wherein the channel access parameter frame may be transmitted at least once during the beacon interval.

An STA in a power saving mode, after switched to an awake state from a doze state, may speed up in performing a channel access based on a changed channel access parameter. The STA perform a channel access based on the changed channel access parameter by reflecting channel environment, and accordingly, a possibility of collision with other STN is decreased, thereby the STA speeding up a channel access.

BRIEF DESCRIPTION OF THE DRAWINGS

FIG. 1 is a concept view illustrating the structure of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure basic service set (BSS).

Referring to the upper part of FIG. 1, the WLAN system may include one or more infrastructure basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the BSS as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set), IBSS.

A lower part of FIG. 1 is a concept view illustrating an IBSS.

Referring to the lower part of FIG. 1, the IBSS is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
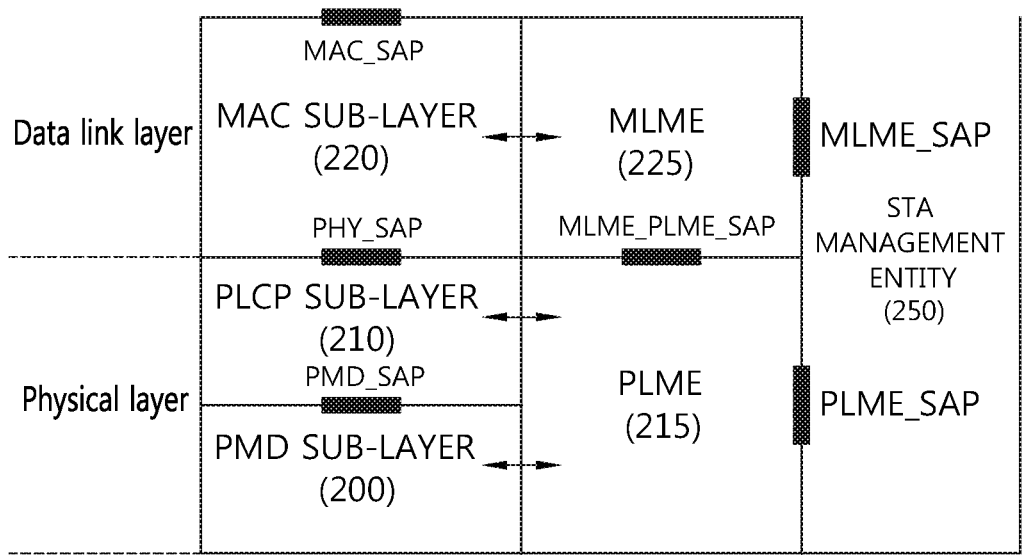
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
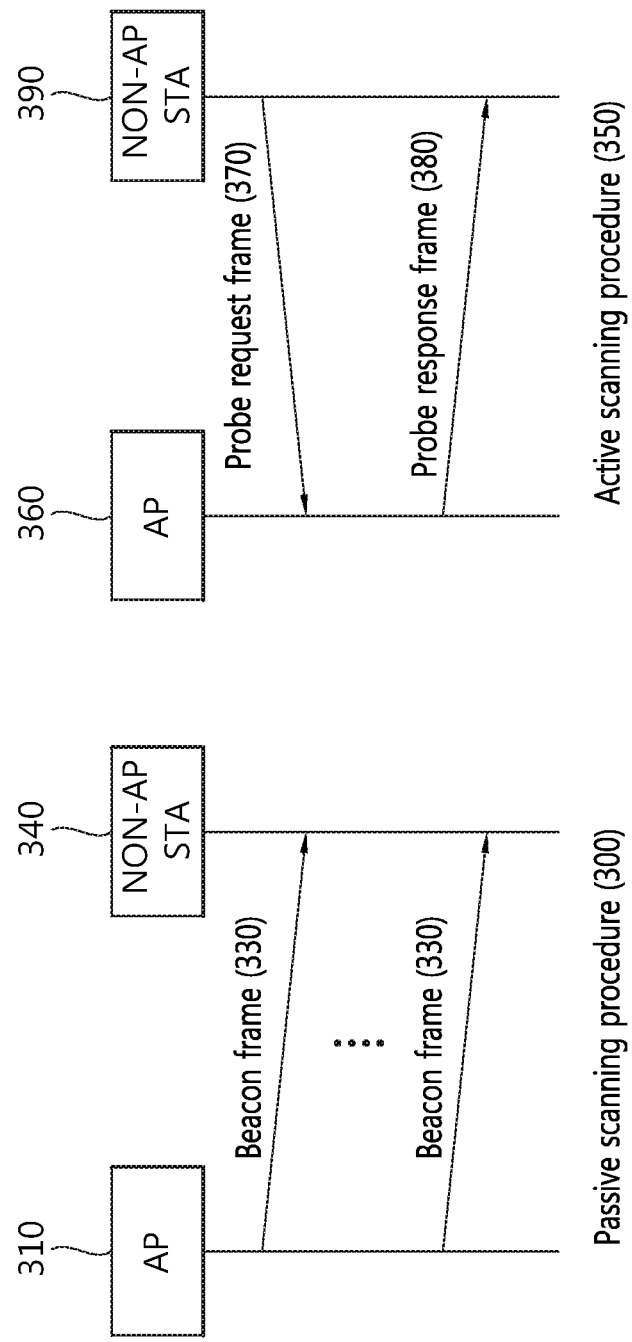
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased compare to the active scanning method. The details of the beacon frame are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, an FILS discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID and BSSID) of an AP that transmits a search frame. It may be implemented that the FILS discovery frame is transmitted to an STA before the beacon frame is transmitted, and thus, the STA may search that an AP is exited in the corresponding channel beforehand. An interval of which the FILS discovery frame is transmitted in one AP is referred to as an FILS discovery frame transmission interval. The FILS discovery frame may be transmitted with a part of information included in the beacon frame being included.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
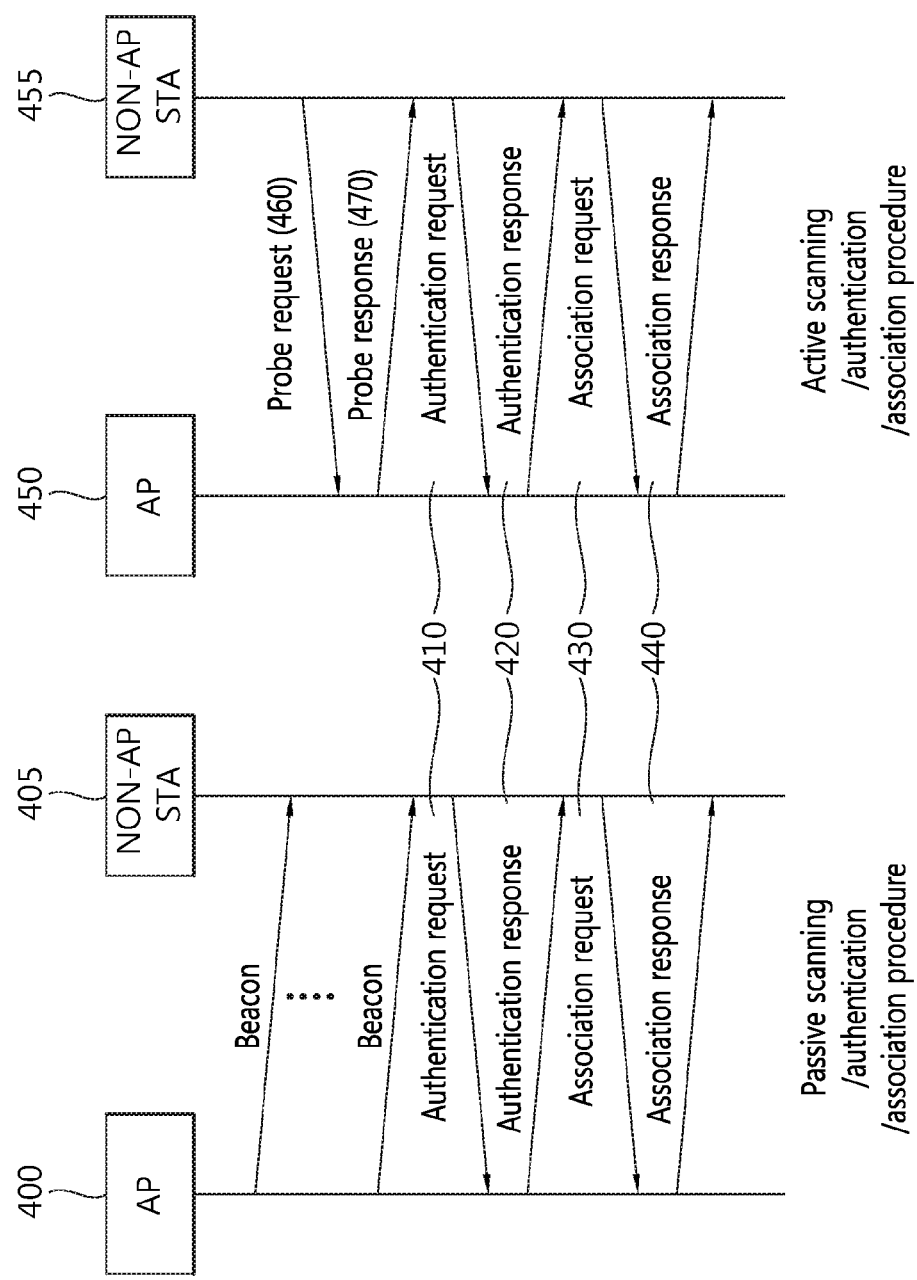
FIG. 4 is a concept view illustrating an authentication and association procedure after scanning between an AP and an STA.

FIG. 4 is a concept view illustrating an authentication and association procedure after scanning between an AP and an STA.

Referring to FIG. 4, after passive/active scanning, the authentication and association may be conducted with one of the scanned APs.

The authentication and association procedure may be carried out by way of, e.g., 2-way handshaking. A left part of FIG. 4 is a concept view illustrating an authentication and association procedure after passive scanning, and a right part of FIG. 4 is a concept view illustrating an authentication and association after active scanning.

The authentication and association procedure may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication procedure may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

In the association process, the non-AP STA 405 or 455 may transmit the association request frame 430 to the AP 400 or 405. In response to the association request frame 430, the AP 400 or 450 may transmit the association response frame 440 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case that such support is available, the AP 400 or 450 may transmit the association response frame 440 to the non-AP STA 405 or 455. The association response frame 440 may include whether the association request frame 440 is accepted or no, and the reason for the acceptance, and its supportable capability information. The association frame format is set forth in IEEE 802.11 chapters 8.3.3.5/8.3.3.6.

After the association process is performed between the AP and the non-AP, normal data transmission and reception may be performed between the AP and the non-AP. In case that the association process between the AP and the non-AP is failed, the association process may be performed again on the reason why the association is failed, or association with other AP may be performed.

Figure 5:
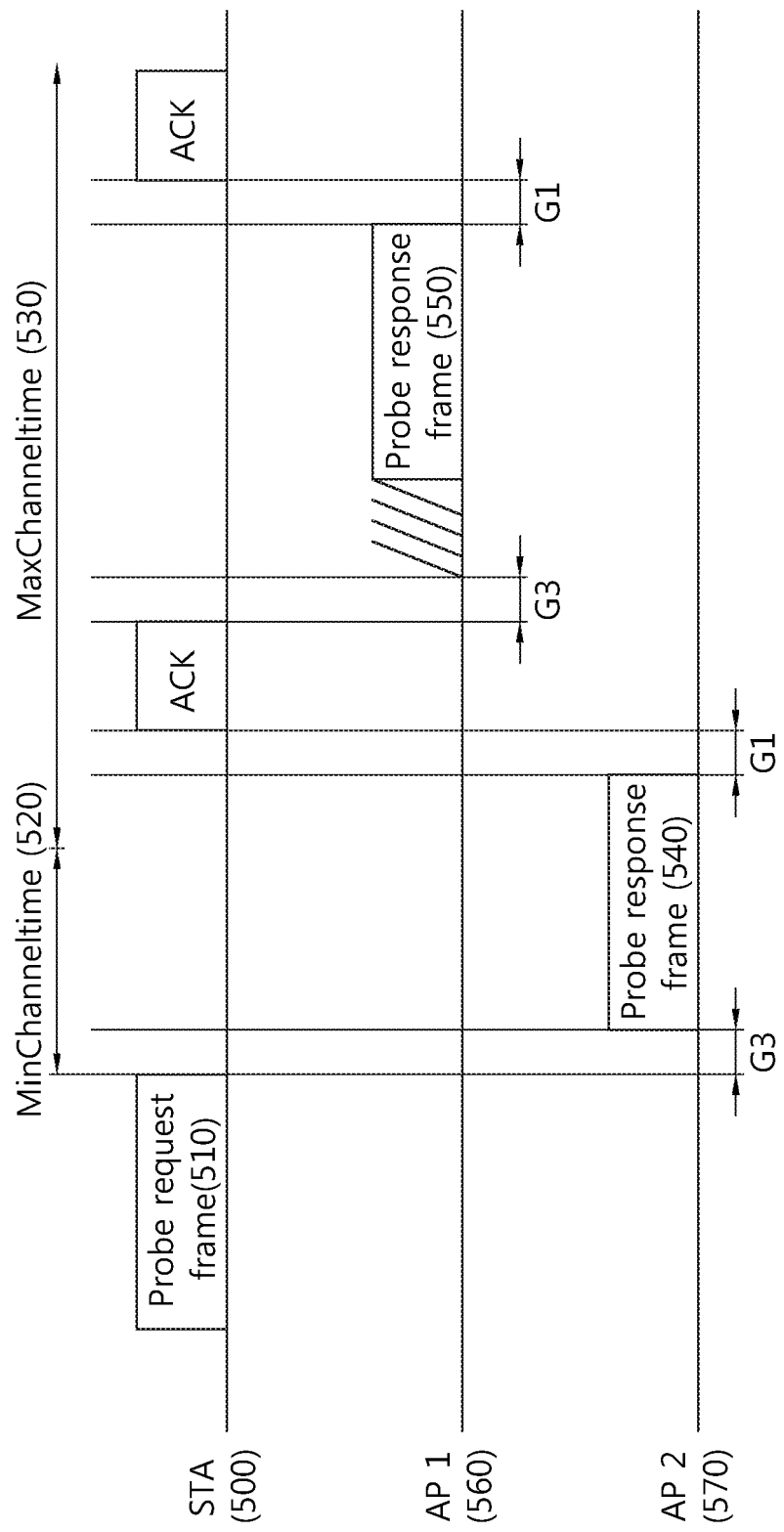
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

For example, the STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) STA(500) can generate the probe request frame including information for specifying the APs 560 and 570 included in MLME-SCAN.request primitive (for example, SSID (service set identification) and BSSID (basic service set identification) information).

The BSSID may have a value corresponding to the MAC address of the AP as an indicator to specify the AP. The SSID is a network term for specifying an AP, which may be read by a person who operates the STA. The BSSID and/or SSID may be used to specify an AP.

The STA 500 may transmit a probe request frame to the specified AP1 560 and the AP2 570. The AP1 560 and the AP2 570 that receive the probe request frame 510 may transmit a probe response frame to the STA 500.

The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 6. For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used for performing the operation for changing channels in which the STA 500 performs active scanning. For example, in case that the STA 500 fails to detect the transmission of other frame (e.g., the probe response frame 550 and 560) until the probe timer reaches the minimum channel time 520, the STA 500 shifts scanning channels to perform scanning on other channel. In case that the STA 500 detects the transmission of other frame until the probe timer reaches to the minimum channel time 520, the STA 500 may monitor channels until the probe timer reaches the maximum channel time 530. When the probe timer reaches the maximum channel time 530, the STA may process the received probe response frames 540 and 550.

The STA 500 may search PHY-CCA.indication primitive until the probe timer reaches the minimum channel time 520 and may determine whether other frames received through channel are existed until the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set a net allocation vector (NAV) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the net allocation vector (NAV) to 0 and may then scan a next channel.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

Figure 6:
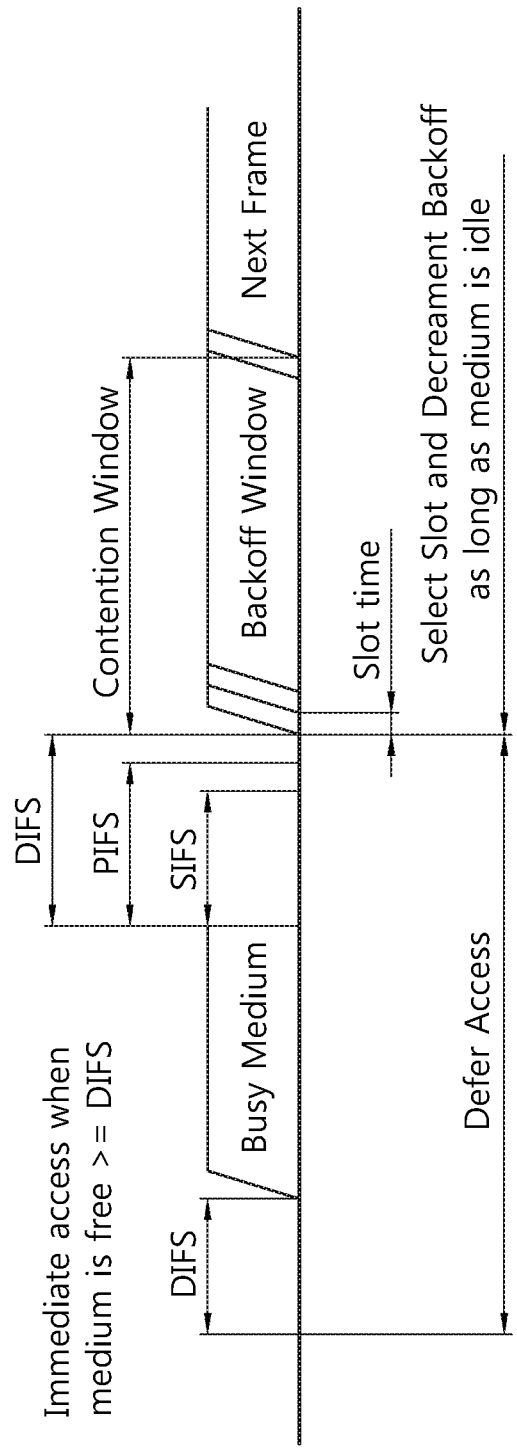
FIG. 6 is a conceptual diagram illustrating a channel access process based on DCF.

FIG. 6 is a conceptual diagram illustrating a channel access process based on DCF.

During the channel access based on DCF, an STA may determine whether to use a medium using carrier sensing mechanism. If the medium is not in use during the DCF inter frame symbol (DIFS) duration or longer (i.e., in case that the channel is idle during the DIFS), the STA may transmit a MAC protocol data unit (MPDU) which is about to be transmitted.

On the other hand, if the medium is in use during the DIFS duration (i.e., in case that the channel is busy during the DIFS), the STA may setup a backoff time by random backoff algorithm.

The backoff time is a waiting time until transmitting frame after the channel is waited for a predetermined time (e.g., DIFS), and the backoff time may be defined as the following equation.

$$\text{BackoffTime} = \text{Random}(\ ) \times a\text{SlotTime} \qquad \text{<Equation 1>}$$

Random( ) is a function for obtaining a pseudo-random integer which is selected with uniform distribution in an interval [0, CW]. CW may be selected among integers which are aCWMin or more and aCWmax or less. The aCWMin and aCWmax may be determined according to their PHY characteristics. aSlotTime may be a time unit which is defined according to the PHY characteristics.

The STA determine whether the channel is idle, and may decrease the backoff time in a unit of SlotTime if the channel is idle. Before the backoff time is decreased in a unit of SlotTime, the STA may determine whether the channel is idle again for a duration that corresponds to DIFS. In case that the backoff time becomes 0, the STA may transmit frames through a medium by performing a channel access.

Figure 7:
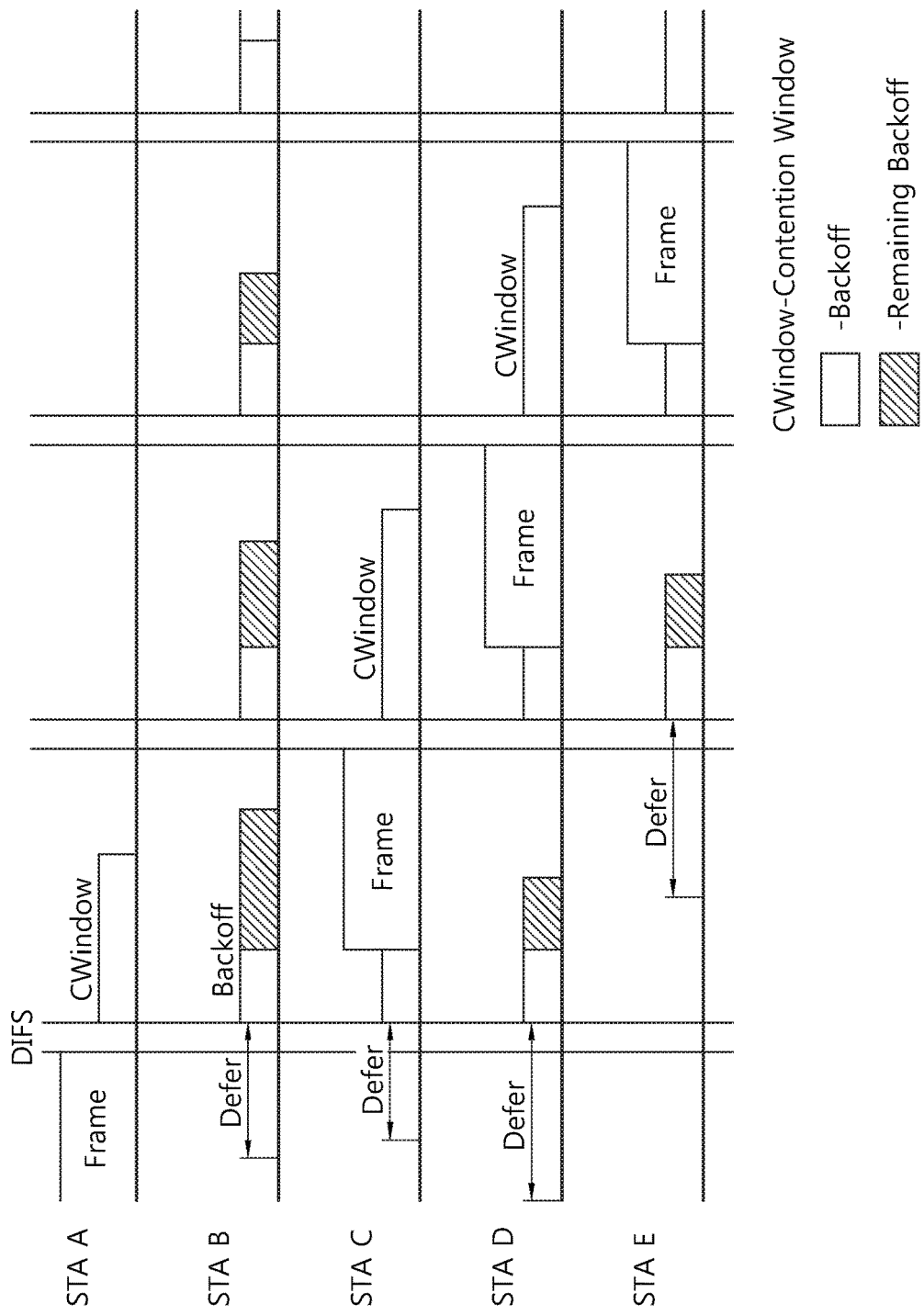
FIG. 7 is a conceptual diagram illustrating a backoff process performed by a plurality of STAs.

FIG. 7 is a conceptual diagram illustrating a backoff process performed by a plurality of STAs.

Referring to FIG. 7, a backoff time (or a size of contention window) may be decreased after a medium is determined to be idle for DIFS duration. If an activity of medium is not detected, an STA may decrease the backoff time in a unit of SlotTime. If the medium is determined to be in use, the STA may delay the decrease of backoff time. Transmission of frames by the STA may be started on every time when the configured backoff time becomes 0.

After the frame transmission by STA A, each of STA B, STA C and STA D may decrease the configured backoff time. STA C of which backoff time is decreased to 0 most quickly among STA B, STA C and STA D may transmit frames through a medium. While STA C transmits frames, decrease of backoff time on STA B and STA D may be delayed.

Further, the DCF transmission scheme includes an RTS/CTS access mode in which control frames (RTS frame and CTS frame) are exchanged before a data frame is transmitted to pre-occupy a channel. Such scheme may reduce channel waste by replacing a collision that may occur upon transmission of a data frame with a collision by a relatively short control frame. The access modes based on the RTS frame/CTS frame will be described below.

As another method for sharing a radio medium by a plurality of STAs at the MAC layer, a point coordination function (PCF) may be defined. The above-described DCF is based on the CSMA/CA scheme and is thus not able to guarantee real-time transmission of data transmitted between an STA and an AP. In contrast, the PCF may be used as a method for providing quality of service (QoS) upon real-time data transmission. The PCF is a non-contention-based transmission service, different from the DCF. The PCF does not use the entire transmission duration of medium exclusively, but may use it alternately with a DCF-type contention-based service. In the PCF, a point coordinator which is implemented in the AP of the BSS may control the right for each STA to be able to occupy the medium using a polling scheme. The PIFS, which is an IFS on the PCF-type access, may be setup to be smaller than the DIFS, which is an IFS on the DCF-type access. By using such a method, the STA which is access to the medium based on the PCF may have a priority to the STA which is access to the medium based on the DCF. The IFS denotes an interval between frames, and the IFS may be used to set a priority in which an STA accesses the medium. The IFS may be specifically defined as follows.

Figure 8:
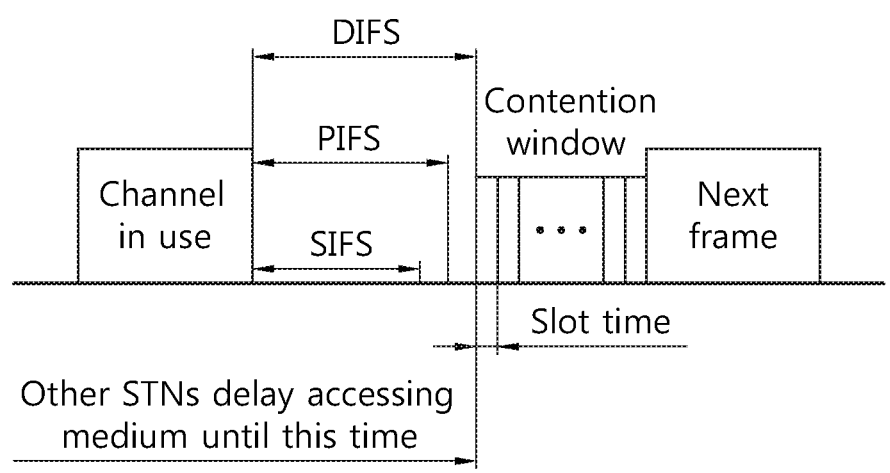
FIG. 8 is a conceptual diagram illustrating a frame interval.

FIG. 8 is a conceptual diagram illustrating a frame interval.

Referring to FIG. 8, the interval between two frames may be referred to as an inter frame symbol (IFS). An STA may determine whether a channel is being used for a time period of the IFS as defined in the standards, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority
(2) PIFS (PCF IFS): used upon PCF frame transmission
(3) DIFS (DCF FIS): used upon DCF frame transmission
(4) EIFS (Extended IFS): used only when frame transmission error occurs. Not fixed interval In case the DCF is used for a plurality of STAs to share a radio medium at the MAC layer, various problems may arise. For example, when the DCF is used, if a plurality of STAs simultaneously conducts initial access to an AP, collision frequently occurs between the frames transmitted by a plurality of STAs. Further, the DCF lacks the concept of transmission priority. Accordingly, the quality of service (QoS) for traffic data transmitted from an STA is not guaranteed. To address such issues, 802.11e defines a new coordination function, hybrid coordination function (HCF), to enhance the channel access capability of the existing DCF and HCF. The HCF defines two channel access schemes, HCF controlled channel access (HCCA) and enhanced distributed channel access (EDCA), similar to those defined in 802.11 MAC.

In the EDCA and the HCCA, traffic categories for determining transmission priority of frames are defined. Based on the traffic categories, the priority on performing access to channels may be determined. That is, according to the traffic categories transmitted by STA, CW and IFS, which are different from each other, may be defined. The CW and IFS, which are different from each other, may determine the priority of channel access according to the category of traffic data included in the frames.

For example, in case traffic data is an email, the traffic data may be allocated to a low priority class. As another example, in case traffic data is a voice communication through a wireless LAN, the traffic data may be allocated to a high priority class.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an arbitration inter-frame space (AIFS) that is shorter than the IFS that is a frame interval defined in the DCF. Further, the EDCA enables an STA to access a channel without contention during a period that is referred to as a Transmit Opportunity (TXOP). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 9:
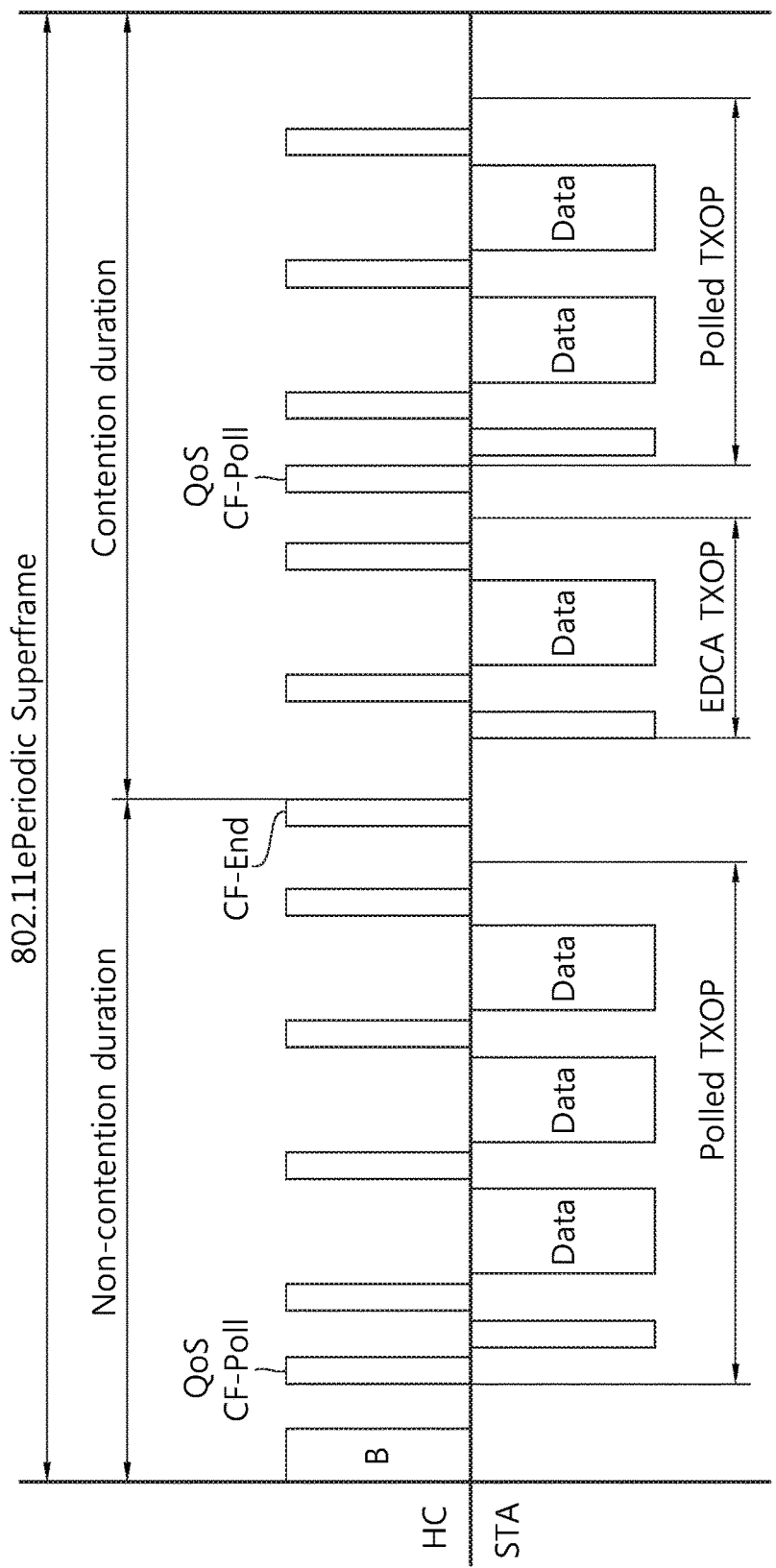
FIG. 9 is a conceptual diagram illustrating a method of obtaining a TXOP by an STA.

In such a channel access method described above, if the STA wrongly senses whether the medium is idle when sensing medium based on the carrier sensing mechanism, collision between transmitted data may occur. FIG. 9 below shows a case that a state of medium determined by an STA is different from actual state of medium.

FIG. 9 is a conceptual diagram illustrating a method of obtaining a TXOP by an STA.

Referring to FIG. 9, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

Hereinafter, among the channel access schemes defined in the HCF, the EDCA will be described in detail.

In the EDCA scheme, the channel access may be conducted with eight user priorities defined for traffic data. For priority-based QoS data frame transmission, the EDCA defines four access categories (ACs: AC_BK (background), AC_BE (best effort), AC_VI (video) and AC_VO (voice)). The EDCA may, based on the ACs, map the traffic data arriving at the MAC layer with different user priorities as in the following Table 1.

Table 1 exemplifies the mapping between the user priorities and the ACs.

TABLE 1

| Priority | User priority | Access category (AC) |
|---|---|---|
| Low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| High | 7 | AC_VO |

A transmission queue and an AC parameter may be defined for each AC. The differences in transmission priority between the ACs may be implemented based on the AC parameter values set to be different from each other. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin[AC] decrease, a higher priority is given, and accordingly, the channel access delay shortens, thus allowing for use of more bands in a given traffic environment.

In case that a collision occurs between frames transmitted from each of a plurality of STAs, an EDCA backoff procedure of generating a new backoff counter may be similar to the existing DCF backoff procedure. The differentiated backoff procedures for each AC may be performed based on different EDCA parameters. The EDCA parameters may differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 10:
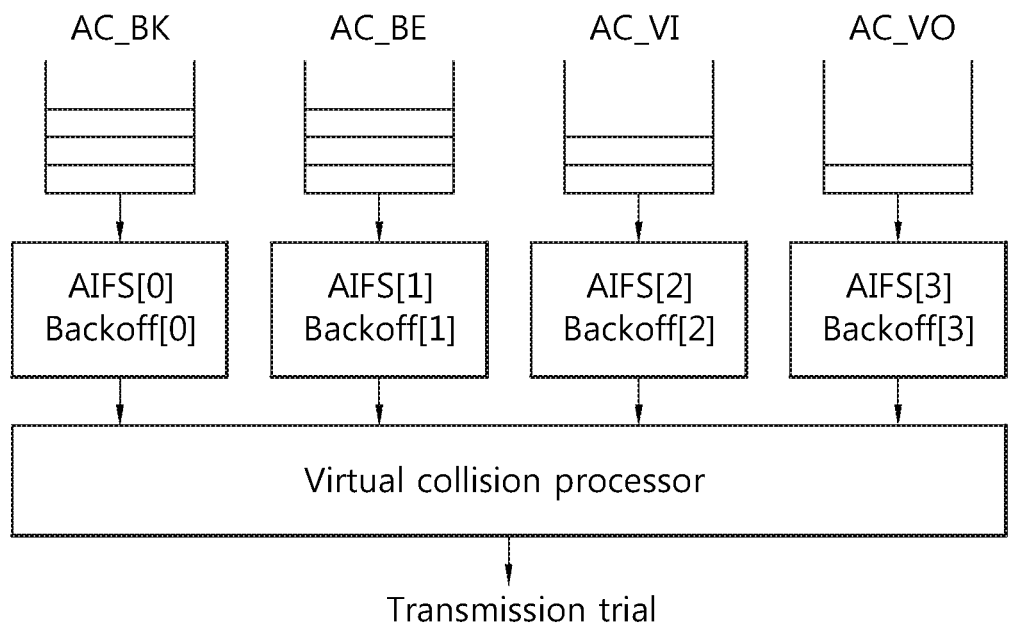
FIG. 10 is a conceptual diagram illustrating an EDCA channel reference model.

FIG. 10 is a conceptual diagram illustrating an EDCA channel reference model.

Referring to FIG. 10, the transmission queue for each of the four ACs defined in 802.11e MAC may play a role as an individual EDCA contention entity for radio medium access in one STA. One AC may retain an independent backoff counter with its own AIFS value. If there exist one or more ACs that simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 11:
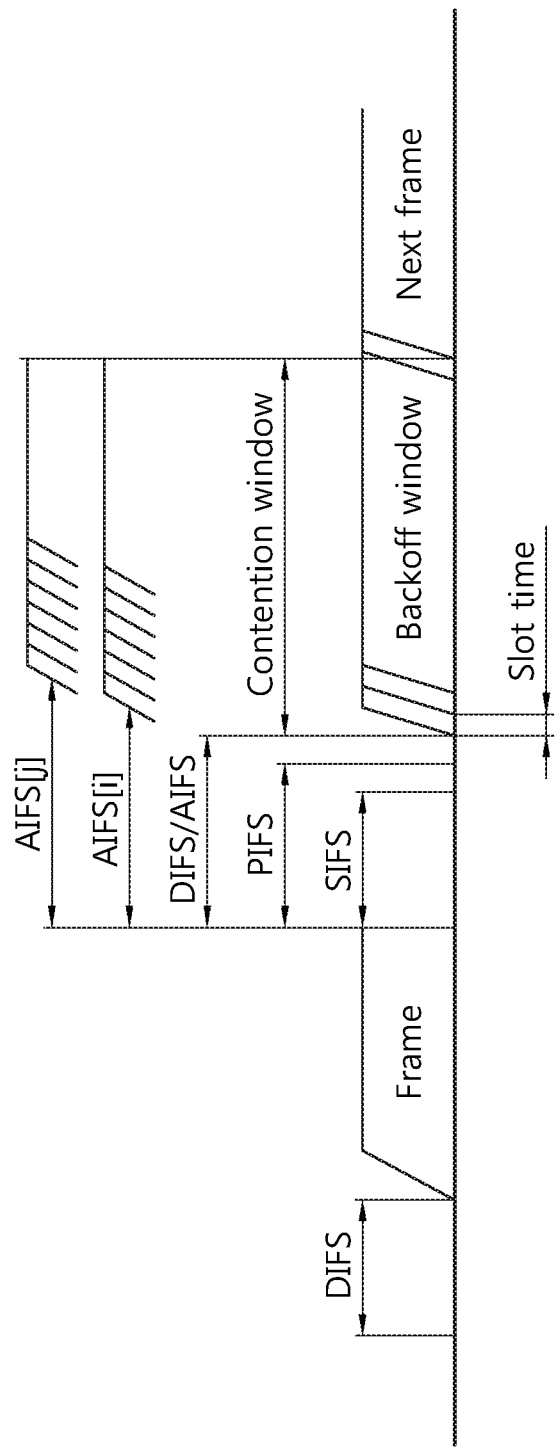
FIG. 11 is a conceptual diagram illustrating a backoff procedure of an EDCA.

FIG. 11 is a conceptual diagram illustrating a backoff procedure of an EDCA.

Referring to FIG. 11, each traffic data transmitted from an STA has a priority, and a backoff procedure may be conducted based on a contentious EDCA scheme. For example, the priorities respectively assigned to the traffics, as set forth above in Table 1, may be separated into eight, for example. As described above, one STA has different output queues depending on priorities, and each output queue is operated according to the EDCA rules. Each output queue may transmit traffic data using different arbitration interframe spaces (AIFSs) according to each priority instead of the conventionally used DCF Interframe Spaces (DIFSs). Further, in case STAs are supposed to transmit traffics having different priorities at the same time, a traffic having a higher priority is transmitted earlier than the others, thereby preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

$$T_b[i]=\text{Random}(i) \times \text{SlotTime} \quad \text{<Equation 2>}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window CWnew[i] is computed using the following Equation 3 including a previous window CWold[i]:

$$CW_{new}[i]=((CW_{old}[i]+1) \times PF)-1 \quad \text{<Equation 3>}$$

Here, PF is computed according to the procedure defined in the IEEE 802.11e standard. CWmin[i], AIFS[i], and PF value may be transmitted from the AP using a QoS parameter set element that is a management frame.

Figure 12:
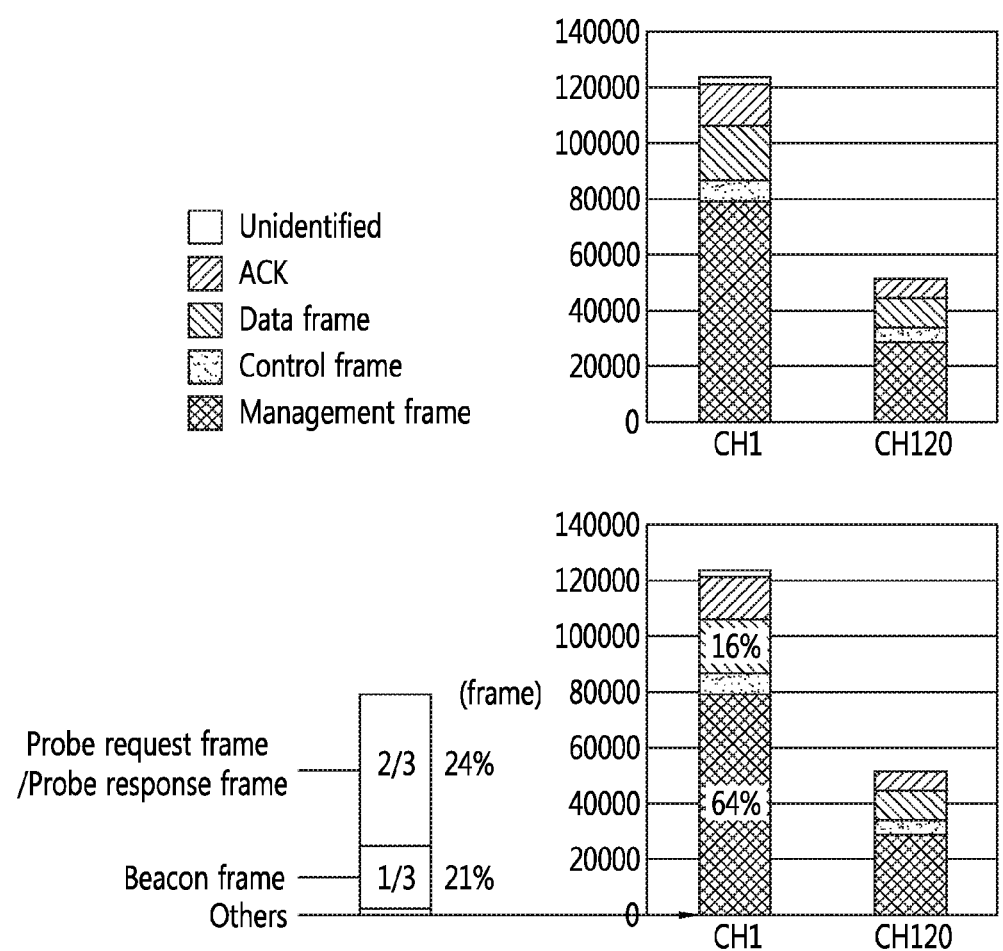
FIG. 12 is a graph illustrating a ratio of frame which is transmitted or received in a wireless local area network (WLAN) environment according to conventional art.

FIG. 12 is a graph illustrating a ratio of frame which is transmitted or received in a wireless local area network (WLAN) environment according to conventional art.

In an upper part of FIG. 12, it is illustrated a graph classifying an entire frame which is monitoring a wireless medium for 5 minutes in a frequency band of 2.4 GHz according to a characteristic of the frame. The entire frame may be classified into one of an acknowledgement (ACK) frame, a data frame, a control frame and a management frame.

Referring to the upper part of graph shown in FIG. 12, the management frame occupies about 65% of the entire frame. That is, the management frame occupies the greater part of the frame which is transmitted or received through a wireless medium in a frequency band of 2.4 GHz.

The graph shown in a lower part of FIG. 12 classifies the management frame which is currently transmitted or received in a frequency band of 2.4 GHz in detail.

Referring to the lower part of graph shown in FIG. 12, about two thirds of the management frame is occupied by probe request frame/probe response frame and about one third of the management frame is occupied by a beacon frame and other management frames.

In a dense WLAN environment, the number of STA and AP increases. Accordingly, the management frame such as the probe request frame/probe response frame or the beacon frame for associating APs and STAs among the entire frame may be more increased.

As described above, in a dense WLAN environment, the random number may be selected between 0 and CW-1 for the random access based on CSMA/CA. The random number may be decreased in every slot time, and in case that the random number becomes to 0, an STA may transmit frames through a wireless medium. If a collision occurs between frames which are transmitted through the random access, CW for selecting the random number may be increased twice. In case that the transmission of frames through the random access is successful, CW for selecting the random number may be decreased to minimum CW. In a dense WLAN environment such as in a stadium, a lecture hall or an exhibition hall, congestion on radio resources may be occurred owing to trial of channel access by a terminal, and consequently, a collision between frames may occur.

An STA in a power saving mode is switched from a doze state to an awake state between beacon intervals, and may perform a channel access. In this case, the STA may perform a channel access while the STA is unable to receive the beacon frame. In case that the STA is unable to receive an EDCA parameter which is changed through the beacon frame, the STA performs a channel access based on previously stored EDCA parameter instead of the changed EDCA parameter.

The changed EDCA parameter which is transmitted through the beacon frame is for a dense environment in which traffic load is increased, and the previous EDCA parameter which is used by the STA may be a parameter that does not reflect the congestion on channels. Accordingly, in case that the STA performs a channel access based on the previous EDCA parameter, a collision between frames may occur on a channel. Hereinafter, in the embodiments of the present invention, a method of transmitting information of an EDCA parameter to an STA and performing a channel access based on the EDCA parameter that the STA received will be described.

Figure 13:
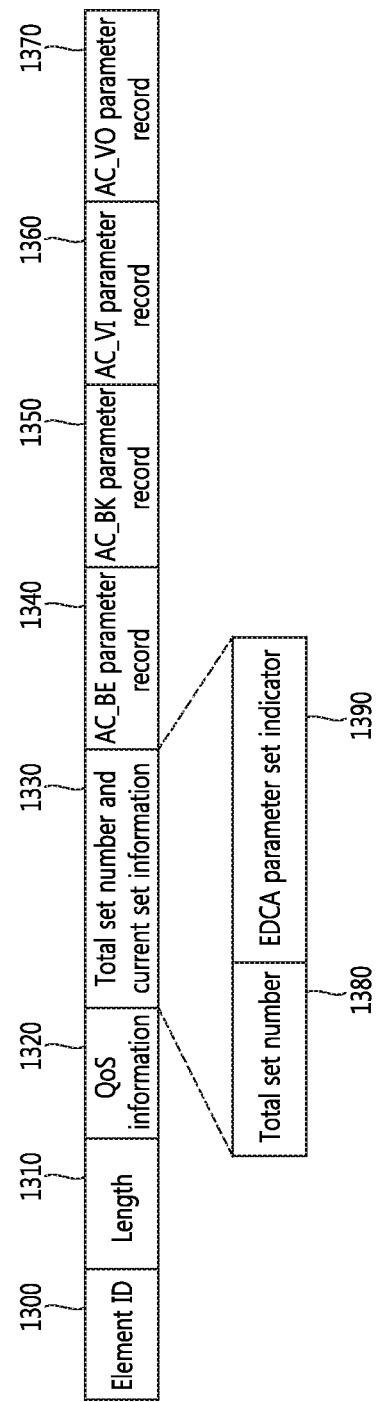
FIG. 13 is a conceptual diagram illustrating multiple EDCA parameter set configuration elements according to an embodiment of the present invention.

FIG. 13 is a conceptual diagram illustrating multiple EDCA parameter set configuration elements according to an embodiment of the present invention.

Referring to FIG. 13, the multiple EDCA parameter set configuration elements may transmit information of an EDCA parameter set. The multiple EDCA parameter set configuration elements may be transmitted to an STA through a beacon frame, a probe response frame or an association response frame.

The multiple EDCA parameter set configuration elements may include an element ID 1300, a length 1310, QoS information (QoS info) 1320, information of total set number and current set 1330, AC_BE parameter record 1340, AC_BK parameter record 1350, AC_VI parameter record 1360 and AC_VO parameter record 1370. The AC_BE parameter record 1340, the AC_BK parameter record 1350, the AC_VI parameter record 1360 and the AC_VO parameter record 1370 may be expressed by a term, configured EDCA parameter set.

The element ID 1300 may include identifier information of an element format. For example, the element ID 1300 may indicate the multiple EDCA parameter set configuration elements.

The length 1310 may include information of a length of an element format. For example, the length 1300 may indicate lengths of the multiple EDCA parameter set configuration elements.

The QoS information 1320 may include information on change number of an AC parameter.

The AC_BE parameter record 1340 may include information of the EDCA parameters (e.g., AIFSN, CWmin and CWmax), if an access category is BE.

The AC_BK parameter record 1350 may include information of the EDCA parameters if an access category is BK.

The AC_VI parameter record 1360 may include information of the EDCA parameters if an access category is VI.

The AC_VO parameter record 1370 may include information of the EDCA parameters if an access category is VO.

The information of total set number and current set 1330 may include information of a number of the multiple EDCA parameter sets and one EDCA parameter set which is used in current channel. Hereinafter, in the embodiments of the present invention, one EDCA parameter set may signify a unit including EDCA parameters for each of the multiple access categories. In the embodiments of the present invention, multiple EDCA parameter sets may be defined and one of the multiple EDCA parameter sets may be used for a channel access by an STA.

For example, the information of total set number and current set 1330 may include a total set number 1380 and a current EDCA parameter set indicator 1390 as a lower information. The total set number 1380 may include information on a number of the multiple EDCA parameter sets, and the current EDCA parameter set indicator 1390 may indicate one EDCA parameter set which is used in current channel.

Each of the multiple (N numbered) EDCA parameter sets that an STA uses for a channel access may be defined as follows:

EDCA parameter set 1 may include a first EDCA parameter (e.g., CWmin, CWmax, etc.) that corresponds to each of the access categories that are determined based on the configured EDCA parameter sets (AC_BE parameter record, AC_BK parameter record, AC_VI parameter record and AC_VO parameter record) that are included in the multiple EDCA parameter set configuration elements.

EDCA parameter set 2 may include a second EDCA parameter for each of the access categories that are determined based on the first EDCA parameter of EDCA parameter set 1. For example, among the second EDCA parameter for each of the access categories, CWmin may be determined to be (CWmin of EDCA parameter set 1)×2 and CWmax may be determined to be (CWmax of EDCA parameter set 1)×2.

EDCA parameter set 3 may include a third EDCA parameter for each of the access categories that are determined based on the first EDCA parameter of EDCA parameter set 1. For example, among the third EDCA parameter for each of the access categories, CWmin may be determined to be (CWmin of EDCA parameter set 1)×3 and CWmax may be determined to be (CWmax of EDCA parameter set 1)×3.

EDCA parameter set 4 may include a fourth EDCA parameter for each of the access categories that are determined based on the first EDCA parameter of EDCA parameter set 1. For example, among the fourth EDCA parameter for each of the access categories, CWmin may be determined to be (CWmin of EDCA parameter set 1)×4 and CWmax may be determined to be (CWmax of EDCA parameter set 1)×4.

That is, EDCA parameter set N (N is a natural number of 2 or greater) may include a $N^{th}$ EDCA parameter for each of the access categories that are determined based on the first EDCA parameter of EDCA parameter set 1. For example, among the $N^{th}$ EDCA parameter for each of the access categories, CWmin may be determined to be (CWmin of EDCA parameter set 1)×N and CWmax may be determined to be (CWmax of EDCA parameter set 1)×N.

The equations for determining multiple EDCA parameter sets described above are just examples, but each of the multiple EDCA parameter sets may be determined based on other various equations. A method for determining at least one different EDCA parameter set by considering total number of sets based on EDCA parameter set 1 may be predefined between an STA and an AP. That is, an STA may acquire EDCA parameter set 1 based on the EDCA parameter sets (AC_BE parameter record, AC_BK parameter record, AC_VI parameter record and AC_VO parameter record) that are included in the multiple EDCA parameter set configuration elements, and determine multiple EDCA parameter set by considering information of total number of EDCA parameter sets.

Further, an STA may determine one EDCA parameter set which is used in current channel among the multiple EDCA parameter sets based on the information on the EDCA parameter set which is used in current channel. For example, in case that the current EDCA parameter set indicator indicates 2, an STA may perform a channel access by using the second EDCA parameter that corresponds to EDCA parameter set 2 in the current channel.

Figure 14:
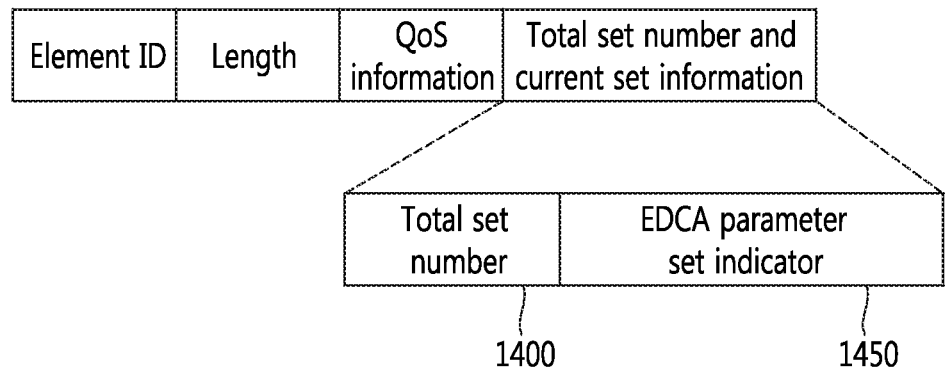
FIG. 14 is a conceptual diagram illustrating multiple EDCA parameter set configuration elements according to an embodiment of the present invention.

FIG. 14 is a conceptual diagram illustrating multiple EDCA parameter set configuration elements according to an embodiment of the present invention.

FIG. 14 shows a method for determining multiple EDCA parameter sets even in case that the EDCA parameter sets (e.g., AC_BE parameter record, AC_BK parameter record, AC_VI parameter record and AC_VO parameter record) that are configured through the multiple EDCA parameter set configuration elements are not transmitted.

The multiple EDCA parameter set configuration elements may include a total set number 1400 and a current EDCA parameter set indicator 1450 as a lower information. The multiple EDCA parameter set configuration elements may be transmitted to an STA through a beacon frame, a probe response frame or an association response frame.

The multiple EDCA parameter sets may be determined based on default parameters (aCWmin and aCWmax). Table 2 below represents a method for determining each of the multiple EDCA parameter sets.

TABLE 2

| AC | CWmin | CWmax |
|---|---|---|
| AC_BK | aCWmin × N | aCWmax × N |
| AC_BE | aCWmin × N | aCWmax × N |
| AC_VI | {(aCWmin + 1)/2 − 1} × N | aCWmin × N |
| AC_VO | {(aCWmin + 1)/4 − 1} × N | {(aCWmin + 1)/2 − 1} × N |

Referring to Table 2, each of the multiple EDCA parameter set may be determined by considering the total set number which is included in the multiple EDCA parameter set configuration elements. For example, in case that the total set number is N, each f the multiple EDCA parameter sets may be determined by substituting each of 1, 2, . . . , N in Table 2.

Table 3 to Table 6 below show each of the multiple default EDCA parameter sets in case that N is 4.

TABLE 3

| AC | CWmin | CWmax |
| --- | --- | --- |
| AC_BK | aCWmin | aCWmax |
| AC_BE | aCWmin | aCWmax |
| AC_VI | (aCWmin + 1)/2 − 1 | aCWmin |
| AC_VO | (aCWmin + 1)/4 − 1 | (aCWmin + 1)/2 − 1 |

Table 3 represents a case that N is substituted by 1 in Table 2, and the first EDCA parameter of EDCA parameter set 1.

TABLE 4

| AC | CWmin | CWmax |
| --- | --- | --- |
| AC_BK | aCWmin × 2 | aCWmax × 2 |
| AC_BE | aCWmin × 2 | aCWmax × 2 |
| AC_VI | ((aCWmin + 1)/2 − 1) × 2 | aCWmin × 2 |
| AC_VO | ((aCWmin + 1)/4 − 1) × 2 | ((aCWmin + 1)/2 − 1) × 2 |

Table 4 represents a case that N is substituted by 2 in Table 2, and the second EDCA parameter of EDCA parameter set 2.

TABLE 5

| AC | CWmin | CWmax |
| --- | --- | --- |
| AC_BK | aCWmin × 3 | aCWmax × 3 |
| AC_BE | aCWmin × 3 | aCWmax × 3 |
| AC_VI | ((aCWmin + 1)/2 − 1) × 3 | aCWmin × 3 |
| AC_VO | ((aCWmin + 1)/4 − 1) × 3 | ((aCWmin + 1)/2 − 1) × 3 |

Table 5 represents a case that N is substituted by 3 in Table 2, and the third EDCA parameter of EDCA parameter set 3.

TABLE 6

| AC | CWmin | CWmax |
| --- | --- | --- |
| AC_BK | aCWmin × 4 | aCWmax × 4 |
| AC_BE | aCWmin × 4 | aCWmax × 4 |
| AC_VI | ((aCWmin + 1)/2 − 1) × 4 | aCWmin × 4 |
| AC_VO | ((aCWmin + 1)/4 − 1) × 4 | ((aCWmin + 1)/2 − 1) × 4 |

Table 6 represents a case that N is substituted by 4 in Table 2, and the fourth EDCA parameter of EDCA parameter set 4.

That is, EDCA parameter set N (N is a natural number of 1 or greater) may include an $N^{th}$ EDCA parameter which is determined based on the default EDCA parameter for each AC. For example, among the $N^{th}$ EDCA parameter for each of the access categories, CWmin may be determined to be (CWmin of EDCA parameter set 1)×N and CWmax may be determined to be (CWmax of EDCA parameter set 1)×N.

Table 2 is an example of an equation for determining EDCA parameter set N. That is, each of the multiple EDCA parameter sets may be determined based on the default EDCA parameter by using other various equations as well as the equations shown in Table 2. A method for determining at least one different EDCA parameter set by considering total number of sets based on the default EDCA parameter set may be predefined between an STA and an AP. That is, an STA may determine each of the multiple EDCA parameter sets based on the predefined equations such as those of shown in Table 2 by considering information on the default EDCA parameter and information on total number of EDCA parameter sets.

In addition, an STA may determine the EDCA parameter which is used in the current channel among the multiple (N numbered) EDCA parameter sets that are determined based on the information 1450 on the EDCA parameter set which is used in current channel.

Figure 15:
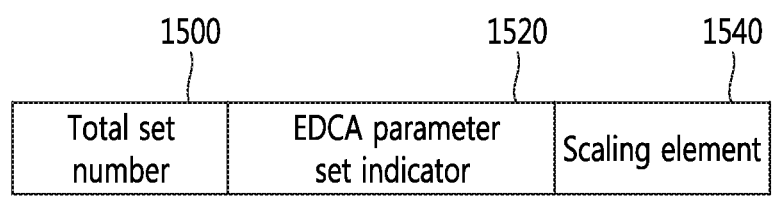
FIG. 15 is a conceptual diagram illustrating multiple EDCA parameter set configuration elements according to an embodiment of the present invention.

FIG. 15 is a conceptual diagram illustrating multiple EDCA parameter set configuration elements according to an embodiment of the present invention.

FIG. 15 shows a method for determining multiple EDCA parameter sets based on a scaling element transmitted through the multiple EDCA parameter set configuration elements. In FIG. 15, similar to FIG. 14, it is assumed that the EDCA parameter sets (e.g., AC_BE parameter record, AC_BK parameter record, AC_VI parameter record and AC_VO parameter record) that are configured through the multiple EDCA parameter set configuration elements are not transmitted.

The multiple EDCA parameter set configuration elements may include a total set number 1500, current set information 1520 and a scaling element 1540. The multiple EDCA parameter set configuration elements may be transmitted to an STA through a beacon frame, a probe response frame or an association response frame. The scaling element 1540 may be used for determining multiple EDCA parameter sets. For example, the scaling element 1540 may be used for scaling EDCA parameters in each of the multiple EDCA parameter sets. In case that the scaling element 1540 is 00, a scaling value may be 1, and in case that the scaling element 1540 is 01, a scaling value may be 2. In case that the scaling element 1540 is 10, a scaling value may be 3, and in case that the scaling element 1540 is 11, a scaling value may be 4.

The multiple EDCA parameter sets may be determined based on default parameters (aCWmin and aCWmax) and the scaling element. Table 7 below represents a method for determining the multiple EDCA parameter sets.

TABLE 7

| AC | CWmin | CWmax |
| --- | --- | --- |
| AC_BK | aCWmin × (N × Set Scaling Factor) | aCWmax × (N × Set Scaling Factor) |
| AC_BE | aCWmin × (N × Set Scaling Factor) | aCWmax × (N × Set Scaling Factor) |
| AC_VI | {(aCWmin + 1)/2 − 1} × (N × Set Scaling Factor) | aCWmin × (N × Set Scaling Factor) |
| AC_VO | {(aCWmin + 1)/4 − 1} × (N × Set Scaling Factor) | {(aCWmin + 1)/2 − 1} × (N × Set Scaling Factor) |

Referring to Table 7, the multiple EDCA parameter set may be determined by considering the total set number 1500 and the scaling element 1540 that are included in the multiple EDCA parameter set configuration elements. For example, in case that the total set number 1500 is N, each f the multiple EDCA parameter sets may be determined by substituting 1, 2, . . . , N in Table 7 and substituting the scaling value transmitted through the scaling element 1540.

Table 8 to Table 11 below show each of the multiple default EDCA parameter sets in case that N is 4 and the scaling value is 2.

TABLE 8

| AC | CWmin | CWmax |
|---|---|---|
| AC_BK | aCWmin × 2 | aCWmax × 2 |
| AC_BE | aCWmin × 2 | aCWmax × 2 |
| AC_VI | ((aCWmin + 1)/2 − 1) × 2 | aCWmin × 2 |
| AC_VO | ((aCWmin + 1)/4 − 1) × 2 | ((aCWmin + 1)/2 − 1) × 2 |

Table 8 represents a case that N is substituted by 1 and the scaling value is substituted by 2 in Table 7, and the first EDCA parameter of EDCA parameter set 1.

TABLE 9

| AC | CWmin | CWmax |
|---|---|---|
| AC_BK | aCWmin × 4 | aCWmax × 4 |
| AC_BE | aCWmin × 4 | aCWmax × 4 |
| AC_VI | ((aCWmin + 1)/2 − 1) × 4 | aCWmin × 4 |
| AC_VO | ((aCWmin + 1)/4 − 1) × 4 | ((aCWmin + 1)/2 − 1) × 4 |

Table 9 represents a case that N is substituted by 2 and the scaling value is substituted by 2 in Table 7, and the second EDCA parameter of EDCA parameter set 2.

TABLE 10

| AC | CWmin | CWmax |
|---|---|---|
| AC_BK | aCWmin × 6 | aCWmax × 6 |
| AC_BE | aCWmin × 6 | aCWmax × 6 |
| AC_VI | ((aCWmin + 1)/2 − 1) × 6 | aCWmin × 6 |
| AC_VO | ((aCWmin + 1)/4 − 1) × 6 | ((aCWmin + 1)/2 − 1) × 6 |

Table 10 represents a case that N is substituted by 3 and the scaling value is substituted by 2 in Table 7, and the third EDCA parameter of EDCA parameter set 3.

TABLE 11

| AC | CWmin | CWmax |
|---|---|---|
| AC_BK | aCWmin × 8 | aCWmax × 8 |
| AC_BE | aCWmin × 8 | aCWmax × 8 |
| AC_VI | ((aCWmin + 1)/2 − 1) × 8 | aCWmin × 8 |
| AC_VO | ((aCWmin + 1)/4 − 1) × 8 | ((aCWmin + 1)/2 − 1) × 8 |

Table 11 represents a case that N is substituted by 4 and the scaling value is substituted by 2 in Table 7, and the fourth EDCA parameter of EDCA parameter set 4.

That is, EDCA parameter set N (N is a natural number of 1 or greater) may include an $N^{th}$ EDCA parameter which is determined based on the default EDCA parameter for each AC. Table 7 is an example of an equation for determining EDCA parameter set N. Each of the multiple EDCA parameter sets may be determined based on various equations. A method for determining at least one different EDCA parameter set by considering the total set number 1500 and the scaling element 1540 based on the default EDCA parameter set may be predefined between an STA and an AP. That is, an STA may determine each of the multiple EDCA parameter sets based on the predefined equations such as those of shown in Table 7 by considering the information on the default EDCA parameter, the information 1500 on a number of the total EDCA parameter set and the scaling element 1540.

In addition, an STA may determine the EDCA parameter which is used in the current channel among the multiple EDCA parameter sets that are determined based on the information 1520 on the EDCA parameter set which is used in current channel.

The method shown in FIG. 15 is one of the methods using the scaling element 1540 for determining the EDCA parameter set, and the scaling element 1540 for determining the EDCA parameter set may be used in other various methods. For example, as described by reference to FIG. 13, the EDCA parameter set N (N is a natural number of 2 or greater) may include the $N^{th}$ EDCA parameter which is determined based on the first EDCA parameter of EDCA parameter set 1, but additionally, the $N^{th}$ EDCA parameter may be determined by considering the scaling element. For example, among the $N^{th}$ EDCA parameter for each of the access categories, CWmin may be determined to be (CWmin of EDCA parameter set 1)×N×scaling element and CWmax may be determined to be (CWmax of EDCA parameter set 1)×N×scaling element.

An STA may perform a channel access by determining the EDCA parameter set for the channel access based on the current EDCA parameter set indicator 1560 which is acquired most recently. The default value may be 1.

In addition, according to an embodiment of the present invention, an AP may determine the EDCA parameter set which will be used for a channel access based on the scaling element and the configured EDCA parameter set.

Figure 16:
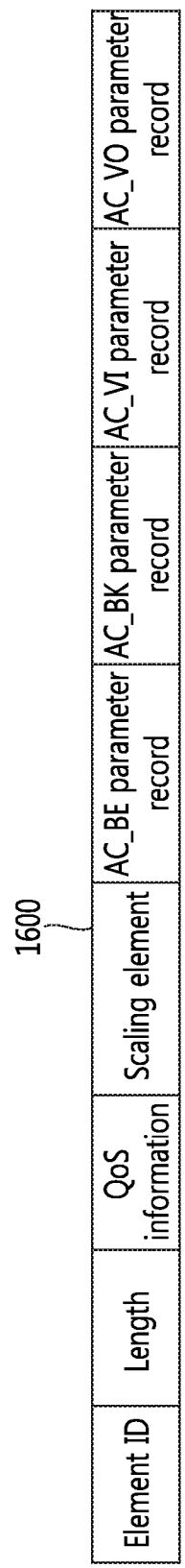
FIG. 16 is a conceptual diagram illustrating multiple EDCA parameter set configuration elements according to an embodiment of the present invention.

FIG. 16 is a conceptual diagram illustrating multiple EDCA parameter set configuration elements according to an embodiment of the present invention.

FIG. 16 shows a method for determining multiple EDCA parameter sets based on a scaling element 1600 and a configured EDCA parameter set.

Referring to FIG. 16, an EDCA parameter that an STA is to use for a channel access may be determined by applying the scaling element 1600 to the EDCA parameter of the configured EDCA parameter set. For example, the EDCA parameter of AC_BE that the STA is to use may be aCWmin×scaling element and aCWmax×scaling element, that are a value of aCWmin and aCWmax of AC_BE of the configured EDCA parameter set multiplied by the scaling element 1600.

If the values of CWmin and CWmax for a specific AC of the configured EDCA parameter set are CWmin=a, CWmax=z and the scaling element is k, the EDCA parameter for a specific AC of the EDCA parameter set that is to be used for a channel access by an STA may be CWmin=a×k and CWmax=z×k.

That is, an STA may determine one EDCA parameter set that is to be used for a channel access based on the configured EDCA parameter set and the scaling element.

As described above, a case may be assumed that an STA operated in a power saving mode is switched from a doze state to an awake state. The STA, that is shifted to the awake state during a beacon interval after an AP transmits information on a EDCA parameter changed through a beacon frame, may not receive the beacon frame immediately. That is, in case that an STA is switched to the awake state from the doze state while the STA is unable to receive a beacon frame transmitting a changed EDCA parameter set, the STA is unable to perform a channel access based on the EDCA parameter which is changed to be matched to current channel situation.

According to an embodiment of the present invention, in order to receive information on a c EDCA parameter which is changed before receiving a beacon frame from an STA, an AP may transmit the information (e.g., at least one of a number of multiple EDCA parameter sets, an EDCA parameter set indicator and an EDCA scaling element) on the EDCA parameter which is changed to short cycle in the beacon frame. Hereinafter, the information for determining the changed EDCA parameter set will be expressed by a term, an EDCA parameter set determination information.

An STA may use various information unit for transmitting the EDCA parameter set determination information in a short cycle in a beacon frame. For example, through a data unit that does not include a data field such as a null data packet (NDP), the EDCA parameter set determination information may be transmitted to an STA in a short cycle during a beacon interval. The EDCA parameter set determination information may also be transmitted through other various PPDU or frame than the NDP format. The frame for transmitting the EDCA parameter set determination information in a short cycle during a beacon interval may also be expressed by a term, a channel access parameter frame.

Figure 17:
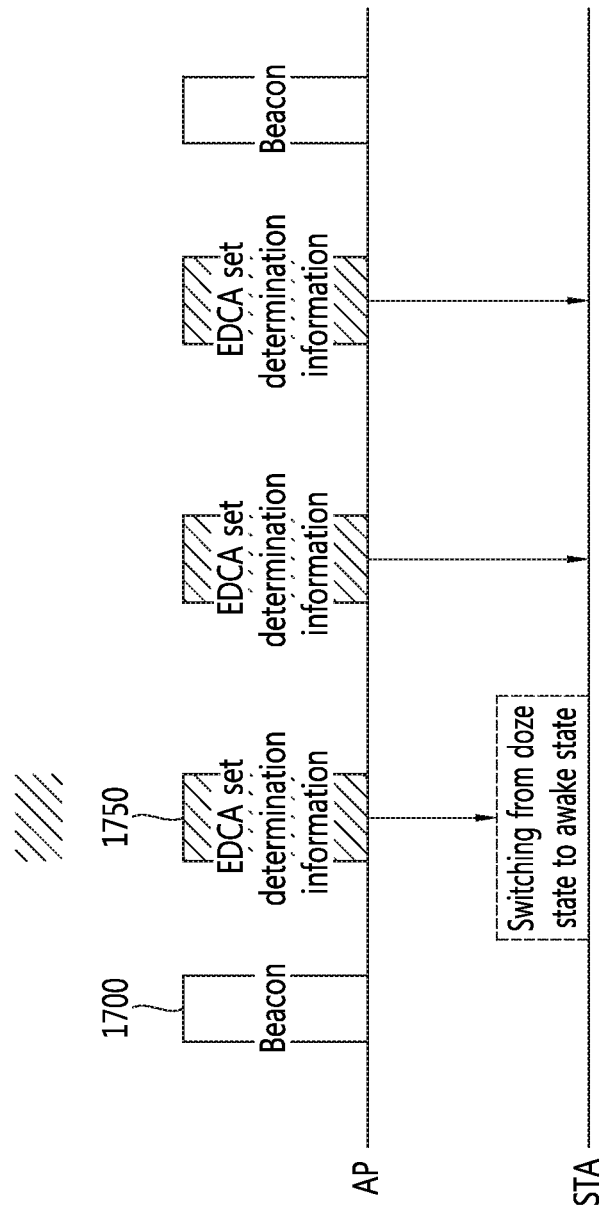
FIG. 17 is a conceptual diagram illustrating a method for receiving EDCA parameter information by an STA according to an embodiment of the present invention.

FIG. 17 is a conceptual diagram illustrating a method for receiving EDCA parameter information by an STA according to an embodiment of the present invention.

Referring to FIG. 17, in case that an STA in a doze state is shifted to an awake state during a beacon interval, the STA may receive frames through a channel by performing channel monitoring based on CCA. Before receiving a beacon frame 1700, the STA may receive an NDP 1750 which is a channel access parameter frame including EDCA parameter set determination information. Of course, an STA in an awake state may also receive that NDP 1750 including the EDCA parameter set determination information as well as the STA shifted to an awake state during a beacon interval.

In case that an STA receives the NDP 1750, the STA may determine an EDCA parameter set which is to be used for a channel access based on the EDCA parameter set determination information. The EDCA parameter that an STA uses for a channel access may be expressed as a term, an EDCA parameter.

The NDP 1750 that includes the EDCA parameter set determination information may be transmitted at least once or more during a beacon interval. Such EDCA parameter set information may be transmitted with a specific cycle during a predetermined duration in case that the EDCA parameter is changed. In addition, in case that the EDCA parameter is not changed, the EDCA parameter set information may not be transmitted. In this case, an STA may monitor a channel for a predetermined duration in order to receive the EDCA parameter set information. In case that a channel access parameter frame that includes the EDCA parameter set information is not transmitted, an STA may perform a channel access based on previously determined (or stored) EDCA parameter. The duration that the STA monitors a channel in order to receive the EDCA parameter set information may be determined based on a cycle that the EDCA parameter set information is transmitted.

Figure 18:
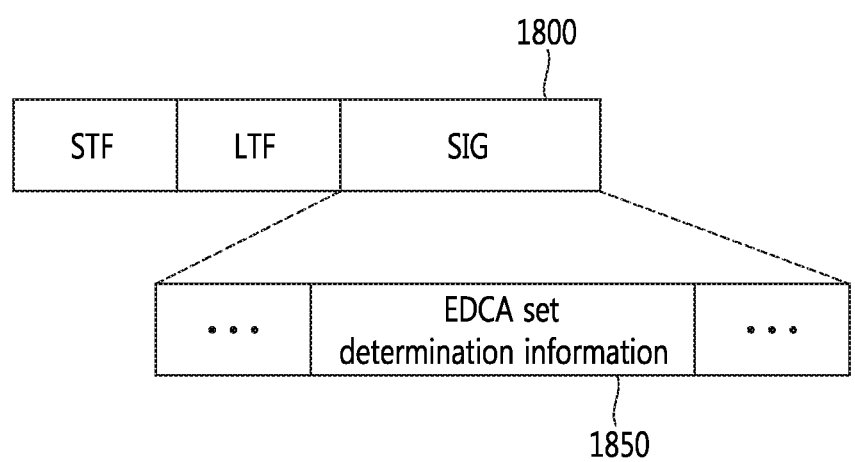
FIG. 18 is a conceptual diagram illustrating an NDP for forwarding EDCA parameter information according to an embodiment of the present invention.

FIG. 18 is a conceptual diagram illustrating an NDP for forwarding EDCA parameter information according to an embodiment of the present invention.

FIG. 18 shows the NDP as a channel access parameter frame.

Referring to FIG. 18, an SIG 1800 of the NDP may include EDCA parameter set determination information 1850.

As described above, the transmission of EDCA parameter set determination information 1850 based on the NDP may be performed in case that the EDCA parameter set determination information 1850 is changed. If the EDCA parameter set determination information 1850 is not changed, the transmission of EDCA parameter set determination information 1850 through the NDP may not be performed.

Figure 19:
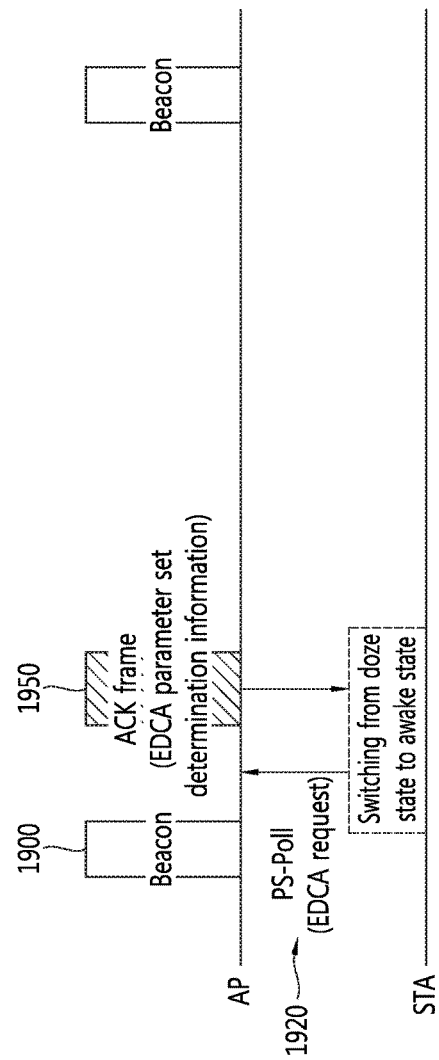
FIG. 19 is a conceptual diagram illustrating a method for receiving EDCA parameter set determination information by an STA according to an embodiment of the present invention.

FIG. 19 is a conceptual diagram illustrating a method for receiving EDCA parameter set determination information by an STA according to an embodiment of the present invention.

FIG. 19 shows a method for an STA to receive the EDCA parameter set information from an AP based on a request of the EDCA parameter set information by the STA.

When transmitting a first uplink frame (e.g., PS-Poll frame; 1920), the STA switched from a doze state to an awake state may request an EDCA parameter set to an AP based on the uplink frame. Only in case that the STA shifted to an awake state fails to receive EDCA parameter set determination information through a beacon frame 1900 or an NDP frame, the request for EDCA parameter set through the first uplink frame by the STA may be performed.

For example, the STA may transmit the uplink frame 1920 with an EDCA request element being included. The EDCA request element may be an indicator for requesting the EDCA parameter set determination information to the AP. If the AP receives the uplink frame 1920 that includes the EDCA request element, the AP may transmit a response (e.g., an ACK frame; 1950) in response to the uplink frame 1920 that includes the EDCA parameter set determination information. The ACK frame may be used as a channel access parameter frame.

Figure 20:
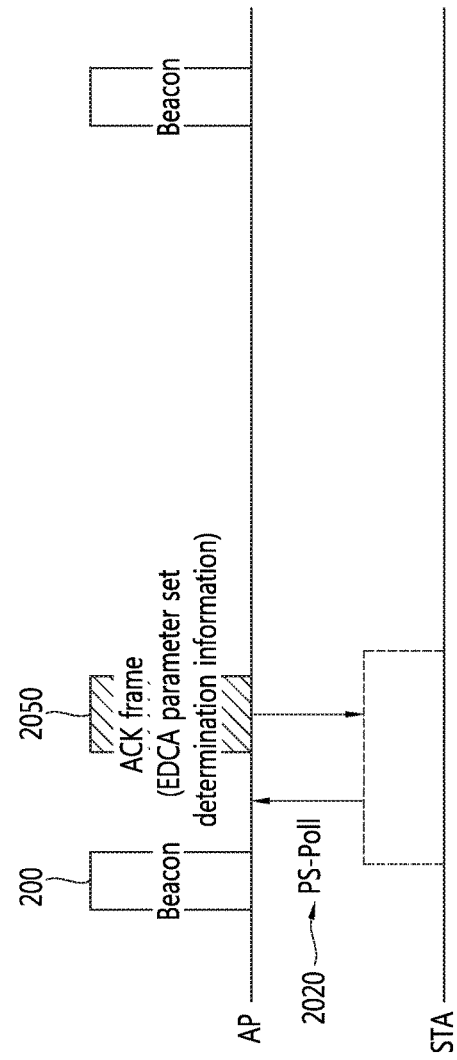
FIG. 20 is a conceptual diagram illustrating a method for receiving EDCA parameter information by an STA according to an embodiment of the present invention.

FIG. 20 is a conceptual diagram illustrating a method for receiving EDCA parameter information by an STA according to an embodiment of the present invention.

FIG. 20 shows a method for receiving EDCA parameter set information by an STA from an AP without a request for the EDCA parameter set information by an STA.

The STA switched from a doze state to an awake state may transmit a first uplink frame (e.g., PS-Poll frame; 2020). In response to the first uplink frame 2020, an AP may transmit a response frame (e.g., an ACK frame) that includes the EDCA parameter set determination information to the STA.

According to the embodiment of the present invention, the EDCA parameter set determination information of the STA may transmitted through the existing response frame such as ACK, NDP ACK, TACK, STACK and so on or newly defined response frame. Or, the EDCA parameter set determination information may be transmitted from the AS to the STA through a data frame, a management frame or a control frame. That is, newly defined response frame as well as the existing response frame may be used as a channel access parameter frame.

Hereinafter, a method for transmitting the EDCA parameter set determination information through the ACK frame 2050 will be described as an example. The AP may transmit the ACK frame 2050 as a response frame to the frame transmitted by the STA. If a more fragments bit of the ACK frame 2050 is set to 1, as shown in Table 12 below, a duration field of the response frame may include the EDCA parameter set information. The more fragments bit is just an example, and other field (e.g., retry=1) may be used for forwarding the EDCA parameter set information.

TABLE 12

| Bits 0-13 | Bits 14 | Bits 15 | Usage |
|---|---|---|---|
| 0-32767 | | 0 | Duration value (in microseconds) within all frames Except: PS-Poll frames transmitted during the CP frames transmitted during the CFP using the HCF |

TABLE 12-continued

| Bits 0-13 | Bits 14 | Bits 15 | Usage |
|---|---|---|---|
| 0 | 0 | 1 | Fixed value under point coordination function (PCF) within frames transmitted during the CFP. Reserved for DMG STAs. |
| 1-4 | 0 | 1 | If the frame is ACK frame and More Fragments bit was set to 1, these bits indicates the Current EDCA Info (or final EDCA parameter set determination info) as follows: Either Current EDCA Parameter Set Indicator or EDCA Scaling Factor Otherwise, reserved. |
| 51-16383 | 0 | 1 | Reserved |
| 0 | 1 | 1 | Reserved |
| 1-2007 | 1 | 1 | AID in PS-Poll frames. Reserved for DMG STAs. |

In case that bit 14 is 0 and bit 15 is 1, values 1 to 4 in respective bits 0 to 13 may be used for transmitting the EDCA parameter set determination information. That is, the EDCA parameter set determination information may be transmitted based on the field of the existing ACK frame.

Figure 21:
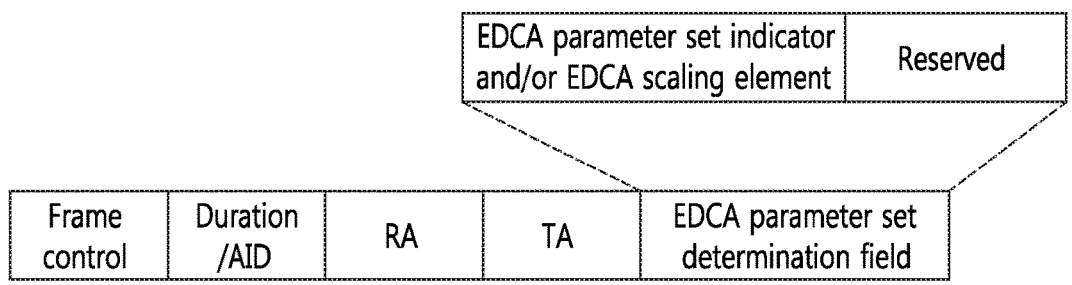
FIG. 21 is a conceptual diagram illustrating a response frame for transmitting an EDCA parameter set determination information according to an embodiment of the present invention.

FIG. 21 is a conceptual diagram illustrating a response frame for transmitting an EDCA parameter set determination information according to an embodiment of the present invention.

FIG. 21 shows a method that the EDCA parameter set determination information is transmitted explicitly or implicitly through the existing field but transmitted explicitly through a separate field.

Referring to FIG. 21, in the response frame such as the ACK frame, an EDCA parameter set determination field may be included as a separate field. The EDCA parameter set determination field may include the information (e.g., at least one of EDCA parameter set indicator and EDCA scaling element) for determining the EDCA parameter set which is used in the current channel.

Figure 22:
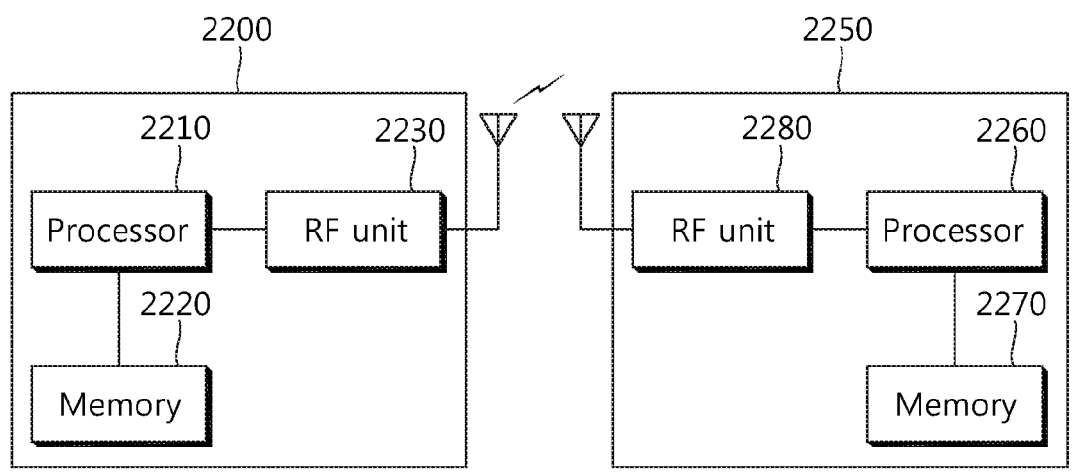
FIG. 22 is a block diagram illustrating a wireless device to which an embodiment of the present invention may apply.

FIG. 22 is a block diagram illustrating a wireless device to which an embodiment of the present invention may apply.

Referring to FIG. 22, the wireless device may be an STA that may implement the above-described embodiments, and the wireless device may be an AP 2200 or a non-AP STA (or STA) 2250.

The AP 2000 includes a processor 2010, a memory 2020, and an RF (Radio Frequency) unit 2030.

The RF unit 2030 may be connected with the processor 2010 to transmit/receive radio signals.

The processor 2010 implements functions, processes, and/or methods as proposed herein. For example, the processor 2010 may be implemented to perform the operation of the above-described wireless device according to an embodiment disclosed in FIG. 13 to FIG. 21 of the present invention.

For example, the processor 2220 may be implemented to transmit a channel access parameter frame during a beacon interval. The channel access parameter frame may include EDCA set determination information.

The STA 2250 includes a processor 2260, a memory 2270, and an RF (Radio Frequency) unit 2280.

The RF unit 2280 may be connected with the processor 1660 to transmit/receive radio signals.

The processor 2260 implements functions, processes, and/or methods as proposed herein. For example, the processor 2260 may be implemented to perform the operation of the above-described wireless device according to an embodiment disclosed in FIG. 13 to FIG. 21 of the present invention.

For example, the processor 2260 may be implemented, when operating in a power save mode, to shift a doze state to an awake state, monitor a channel access parameter frame after being shifted to the awake state, and receive the channel access parameter frame from an AP. The channel access parameter frame may include an EDCA set determination information. Further, the processor 2260 may be implemented to perform a channel access using a channel access EDCA parameter which is determined based on the EDCA set determination information. At the moment, the channel access parameter frame may be transmitted at least once during a beacon interval. The EDCA parameter set indicator may include information indicating one EDCA parameter set which is to be used for a channel access among multiple EDCA parameter sets. In addition, one EDCA parameter set may include the EDCA parameter for each of the multiple access categories, and the scaling element may include information on a scaling value for determining the EDCA parameter. The channel access EDCA parameter may be EDCA parameter information on one access category among the EDCA parameters.

The processor 2210, 2260 may include an ASIC (Application-Specific Integrated Circuit), other chipset, a logic circuit, a data processing device, and/or a converter that performs conversion between a baseband signal and a radio signal. The memory 2220, 2270 may include a ROM (Read-Only Memory), a RAM (Random Access Memory), a flash memory, a memory card, a storage medium, and/or other storage device. The RF unit 2230, 2280 may include one or more antennas that transmit and/or receive radio signals.

When an embodiment is implemented in software, the above-described schemes may be embodied in modules (processes, or functions, etc.) performing the above-described functions. The modules may be stored in the memory 2220, 2270 and may be executed by the processor 2210, 2260. The memory 2220, 2270 may be positioned in or outside the processor 2210, 2260 and may be connected with the processor 2210, 2260 via various well-known means.

What is claimed is:

1. A method for performing a channel access by a station (STA), the method comprising:
    switching, by the STA, an operation in a power saving mode, to an awake state from a doze state during a beacon interval;
    transmitting, by the STA to an access point (AP), an uplink frame requesting enhanced distributed channel access (EDCA) set determination information through a first channel access, if the STA is switched to the awake state,
    wherein the first channel access is performed based on a previously stored EDCA parameter set;
    monitoring, by the STA, a channel access parameter frame including the EDCA set determination information for a changed EDCA parameter set,
    wherein the changed EDCA parameter set is changed by the AP;
    receiving, by the STA, the channel access parameter frame from the AP,
    wherein the channel access parameter frame is received during the beacon interval; and
    performing, by the STA, a second channel access by using the changed EDCA parameter set determined based on the EDCA set determination information.

2. The method of claim 1,
wherein the EDCA set determination information includes an EDCA parameter set indicator,
wherein the EDCA parameter set indicator includes information indicating the change EDCA parameter set which is to be used for the second channel access among multiple EDCA parameter sets, and
wherein the changed EDCA parameter set includes multiple types of EDCA parameters for each of multiple access categories.

3. The method of claim 2, wherein the EDCA set determination information further includes information on a number of the multiple EDCA parameter sets.

4. The method of claim 1, wherein the channel access parameter frame is received if the changed EDCA parameter is changed during the beacon interval.

5. The method of claim 4, further comprising:
performing, by the STA, the second channel access by using the previously stored EDCA parameter set, if the STA fails to receive the channel access parameter frame as a result of monitoring for a transmission cycle of the channel access parameter frame.

6. A STA performing a channel access, the STA comprising:
a radio frequency (RF) unit configured to transmit or receive radio signal;
a processor operatively connected to the RF unit and configured to:
switch an operation in a power saving mode, to an awake state from a doze state during a beacon interval;
transmit an uplink frame requesting enhanced distributed channel access (EDCA) set determination information through a first channel access to an access point (AP), if the STA is switched to the awake state,
wherein the first channel access is performed based on a previously stored EDCA parameter set;
monitor a channel access parameter frame including the EDCA set determination information for a changed EDCA parameter set,
wherein the changed EDCA parameter set is changed by the AP, and wherein the channel access parameter frame is transmitted during the beacon interval;
receive the channel access parameter frame from the AP; and
perform a second channel access by using the changed EDCA parameter set determined based on the EDCA set determination information.

7. The STA of claim 6,
wherein the EDCA set determination information includes an EDCA parameter set indicator,
wherein the EDCA parameter set indicator includes information indicating the changed EDCA parameter set which is to be used for the second channel access among multiple EDCA parameter set, and
wherein the changed EDCA parameter set includes multiple types of EDCA parameters for each of multiple access categories.

8. The STA of claim 7, wherein the EDCA set determination information further includes information on a number of the multiple EDCA parameter sets.

9. The STA of claim 6, wherein the channel access parameter frame is received if the changed EDCA parameter is changed during the beacon interval.

10. The STA of claim 9, wherein the processor is further configured to perform the second channel access by using the previously stored EDCA parameter set, if the STA fails to receive the channel access parameter frame as a result of monitoring for a transmission cycle of the channel access parameter frame.

* * * * *